Nov. 11, 1958    M. C. WEAVER ET AL    2,859,975
CHILD'S VEHICLE
Filed Jan. 23, 1956
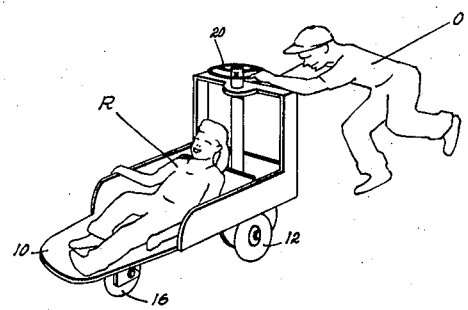
FIG.1
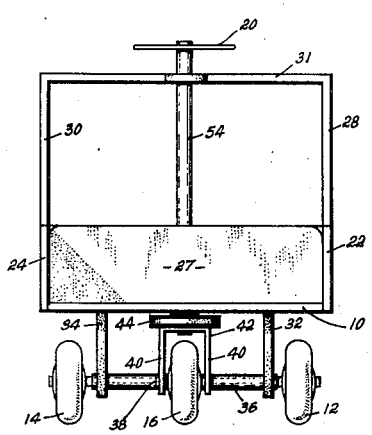
FIG.2
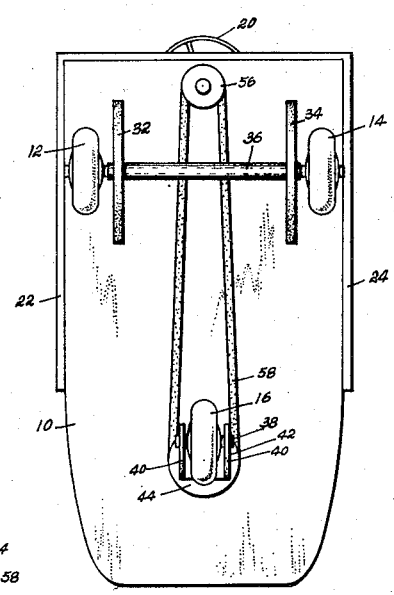
FIG.3
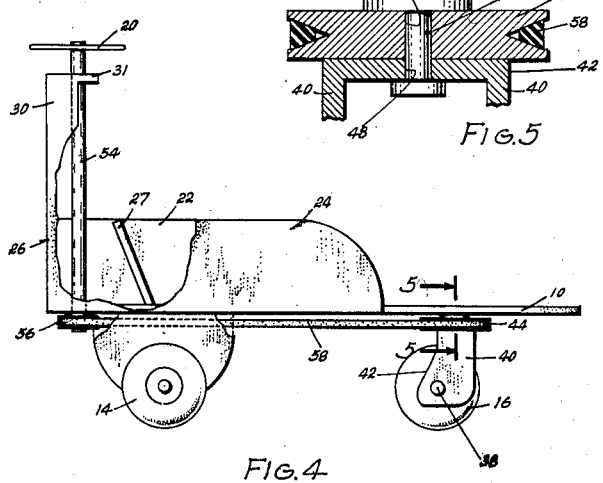
FIG.5
FIG.4
RAYMOND W. LARSON
MAYBELLE C. WEAVER
INVENTOR.
BY Fulwider, Mattingly
and Huntley
ATTORNEYS.

United States Patent Office 2,859,975
Patented Nov. 11, 1958

2,859,975

CHILD'S VEHICLE

Maybelle C. Weaver and Raymond W. Larson,
Long Beach, Calif.

Application January 23, 1956, Serial No. 560,501

1 Claim. (Cl. 280—47.11)

The present invention relates to hand-pushed wheeled vehicles and more particularly to a new and novel child's vehicle wherein one or two riders are adapted to sit while being pushed by others.

It is a major object of the present invention to provide a novel and improved child's vehicle.

It is a further object to provide a child's vehicle which will provide one or two riders with an exciting yet safe ride.

A further object is to provide a child's vehicle which is simple of design and rugged of construction whereby it may afford a long and useful service life even though exposed to the rough handling characteristic of children.

It is yet a further object to provide a child's vehicle which is provided with means for preventing the rider or riders against being thrown therefrom.

An additional object is to provide a child's vehicle which may be manufactured and sold at a comparatively low cost.

These and other objects and advantages of the present invention will become apparent from the following detailed description of a preferred embodiment thereof, when taken in conjunction with the appended drawings, wherein:

Figure 1 is a perspective view of a preferred form of child's vehicle embodying the present invention;

Figure 2 is a front elevational view of said vehicle;

Figure 3 is a view showing the underside of said vehicle;

Figure 4 is a side elevational view of said vehicle; and

Figure 5 is an enlarged vertical sectional view of a steering pulley employed in said child's vehicle.

Referring to the drawings, the preferred form of child's vehicle embodying the present invention includes a flat bottom bed 10 for supporting the weight of one or two riders R. A pair of non-steerable rear wheels 12 and 14 are disposed below the rear portion of the bottom bed 10, and a steerable front wheel 16 is pivotally supported below the front mid-portion of the bottom bed 10. The device is adapted to be pushed by one or two operators O. The operator O grasps a steering wheel 20 whereby he may steer the vehicle at the same time that he pushes it.

More particularly, the flat bottom bed 10 has a front portion which tapers inwardly. A pair of upstanding side walls 22 and 24 extend from the intermediate portion of the bed 10 to the rear thereof. The rear ends of these side walls are rigidly interconnected by an upstanding rear wall 26. This arrangement provides rigidity for the bottom bed at a minimum weight. A rearwardly and upwardly backrest 27 extends between the rear portion of the side walls 22 and 24. A pair of upstanding push posts 28 and 30 extend upwardly from the rear of the bed 10. Preferably, these push posts will constitute integral upward extensions of the rear portions of each of the side walls 22 and 24. A horizontal cross-bar 31 rigidly interconnects the upper ends of the push posts 28 and 30.

The rear wheels 12 and 14 are supported by a pair of downwardly extending ears 32 and 34 having their ends rigidly affixed to the bottom bed 10. The rear wheels 12 and 14 are mounted on the ends of a rear axle 36 that is secured to the lower end of the ears 32 and 34. The front wheel 16 is supported upon a front axle 38. The outer ends of this front axle 38 are secured to the lower ends of the bifurcations 40 of a steering fork 42. The upper end of this steering fork 42 is integrally formed with a front steering pulley 44. As shown in Figure 5, the front steering pulley 44 and the fork 42 are formed with vertically aligned bores 46 and 48 for receiving a vertically extending pivot pin 50. A washer 52 is interposed between the underside of the bed 10 and the top of the front steering pulley 44. Referring to Figure 4, it should be particularly noted that the front axle 38 is disposed rearwardly of the longitudinal axis of the pivot pin 50. With this arrangement, the front wheel 16 will tend to castor itself into alignment with the longitudinal axis of the vehicle upon forward movement of the latter.

The steering wheel 20 is keyed to the upper end of a steering post 54. The upper portion of this steering post 54 is supported by the mid-portion of the cross-bar 31. The lower portion of the steering post 54 is in turn supported by the rear mid-portion of the bottom bed 10. A rear steering pulley 56 is keyed to the lower end of the steering post 54. A V-belt 58 interconnects the front and rear steering pulleys 44 and 56.

In operation, one or two children seat themselves upon the bottom bed 10 with their backs against the back rest 26. The operator O then grasps the cross-bar 31 with one hand and the steering wheel 20 with the other whereby he may propel the vehicle forward while steering same. Rotation of the steering wheel 20 will effect concurrent rotation of the two steering pulleys 44 and 56 and hence of the front wheel 16. It should be particularly noted, that because of the castoring action of the front wheel 16 should the operator O release the steering wheel 20, the front wheel 16 will automatically return the vehicle to straight line motion. It will be found that the above-described vehicle affords a very exciting ride inasmuch as its direction of movement may be changed very quickly by a slight movement of the steering wheel. During such turning movement, however, the rider or riders will be secured against sideward motion off of the bottom bed 10 by means of the two side walls 12 and 14. Additionally, since the center of gravity of the vehicle is low, it will not tend to overturn.

While there has been shown and described hereinabove what is presently considered to be the preferred embodiment of the present invention, it will be apparent that various modifications and changes may be made thereto without departing from the spirit of the invention or the scope of the following claim.

We claim:

A child's vehicle, comprising: a flat bottom bed for supporting the weight of a rider; upstanding side walls extending from the intermediate portion of said bed to the rear thereof for retaining a rider against sideward movement on said bed; a back-rest extending between intermediate portions of said side walls; a rear wall rigidly interconnecting the rear ends of said side walls; a pair of upstanding push posts at the rear of said bed, said push posts being integral upward extensions of said side walls; a cross-bar rigidly interconnecting the upper ends of said push posts; a pair of non-steerable rear wheels disposed below the rear portion of said bed but ahead of said rear wall; a front wheel; front wheel support means including a fork having bifurcations encompassing said front wheel, an axle extending between the lower ends of said bifurcations, a front steering pulley formed above said fork and a vertically extending pivot pin connecting said fork and pulley to the front mid-portion of said bed, the axis of rotation of said axle being spaced rearwardly from the axis of said pivot pin; a generaly vertically extending steering post, the upper portion of said post being supported by the intermediate portion of said cross-bar and the lower portion thereof being supported at the rear mid-portion of said bed; a rear steering pulley keyed to the lower end of said steering post; and an endless V-type belt interconnecting said steering pulleys whereby an operator may grasp said cross-bar with one hand and said steering wheel with the other.

References Cited in the file of this patent

UNITED STATES PATENTS

| | | | |
|---|---|---|---|
| D. 137,962 | Patner | May | 23, 1944 |
| 1,289,361 | Bastman | Dec. | 31, 1918 |
| 1,399,833 | Wiebe | Dec. | 13, 1921 |
| 1,446,140 | Weber | Feb. | 20, 1923 |
| 1,678,836 | Wessborg | July | 31, 1928 |
| 1,711,418 | Linden | Apr. | 30, 1929 |
| 1,747,227 | Daniel | Feb. | 18, 1930 |
| 2,235,045 | Ronning | Mar. | 18, 1941 |
| 2,582,000 | Bloomstran | Jan. | 8, 1952 |
| 2,713,496 | Ayers | July | 19, 1955 |